(12) United States Patent
Brinjes

(10) Patent No.: US 6,911,972 B2
(45) Date of Patent: Jun. 28, 2005

(54) USER INTERFACE DEVICE

(75) Inventor: Jonathan Charles Brinjes, Surrey (GB)

(73) Assignee: Matsushita Electric Industrial Co., Ltd., Osaka (JP)

(*) Notice: Subject to any disclaimer, the term of this patent is extended or adjusted under 35 U.S.C. 154(b) by 437 days.

(21) Appl. No.: 10/109,064

(22) Filed: Mar. 29, 2002

(65) Prior Publication Data

US 2002/0171633 A1 Nov. 21, 2002

(30) Foreign Application Priority Data

Apr. 4, 2001 (GB) ............................................. 0108484

(51) Int. Cl.$^7$ ................................................ G01B 9/00
(52) U.S. Cl. ..................... 345/175; 345/158; 345/178; 178/18.01; 178/18.09; 178/18.1; 178/18.11; 348/47; 348/94; 356/375; 382/103; 382/154; 382/291
(58) Field of Search ................................ 345/158, 175, 345/178; 178/18.01, 18.09, 18.1, 18.11; 348/47, 94; 356/375; 382/103, 154, 291

(56) References Cited

U.S. PATENT DOCUMENTS

| | | | | |
|---|---|---|---|---|
| 4,731,853 A | * | 3/1988 | Hata et al. | ................... 382/153 |
| 4,825,393 A | * | 4/1989 | Nishiya | ....................... 702/152 |
| 4,835,450 A | * | 5/1989 | Suzuki | ................... 318/568.13 |
| 4,858,157 A | * | 8/1989 | Murai et al. | ................. 382/154 |
| 5,561,526 A | * | 10/1996 | Huber et al. | ................. 356/604 |
| 5,606,627 A | * | 2/1997 | Kuo | ............................ 382/154 |
| 5,712,760 A | | 1/1998 | Coulon et al. | |
| RE35,816 E | * | 6/1998 | Schulz | ........................ 356/376 |
| 5,767,842 A | | 6/1998 | Korth | |
| 5,784,282 A | * | 7/1998 | Abitbol et al. | .............. 700/186 |
| 5,828,770 A | * | 10/1998 | Leis et al. | .................. 382/103 |
| 6,028,954 A | * | 2/2000 | Tomita et al. | .............. 382/154 |
| 6,107,995 A | | 8/2000 | Dordick | |
| 6,266,136 B1 | * | 7/2001 | Ramer et al. | .......... 356/139.03 |

FOREIGN PATENT DOCUMENTS

| | | |
|---|---|---|
| DE | 298 02 435 U1 | 6/1998 |
| EP | 0 554 492 A1 | 8/1993 |
| EP | 0 982 676 A1 | 3/2000 |
| EP | 1 039 365 A2 | 9/2000 |
| JP | 2000-029605 | 1/2000 |
| JP | 2000-066818 | 3/2000 |
| WO | 00/21024 | 4/2000 |
| WO | 00/54479 | 9/2000 |

* cited by examiner

*Primary Examiner*—Bipin Shalwala
*Assistant Examiner*—Vincent E. Kovalick
(74) *Attorney, Agent, or Firm*—McDermott Will & Emery LLP

(57) ABSTRACT

There is a described a user interface device having first and second imaging means for forming first and second images of a three-dimensional zone from two different viewpoints, and image data generating means for generating image data corresponding to the first and second images. A processor determines the position of an object within the three-dimensional zone from the image data for the first and second images, associates the determined position with corresponding information and generates a data signal in accordance with the information corresponding to the determined position. In an embodiment, the user interface device is in the form of a virtual keyboard. In another embodiment, the user interface device is in the form of a tablet for handwriting recognition.

38 Claims, 11 Drawing Sheets

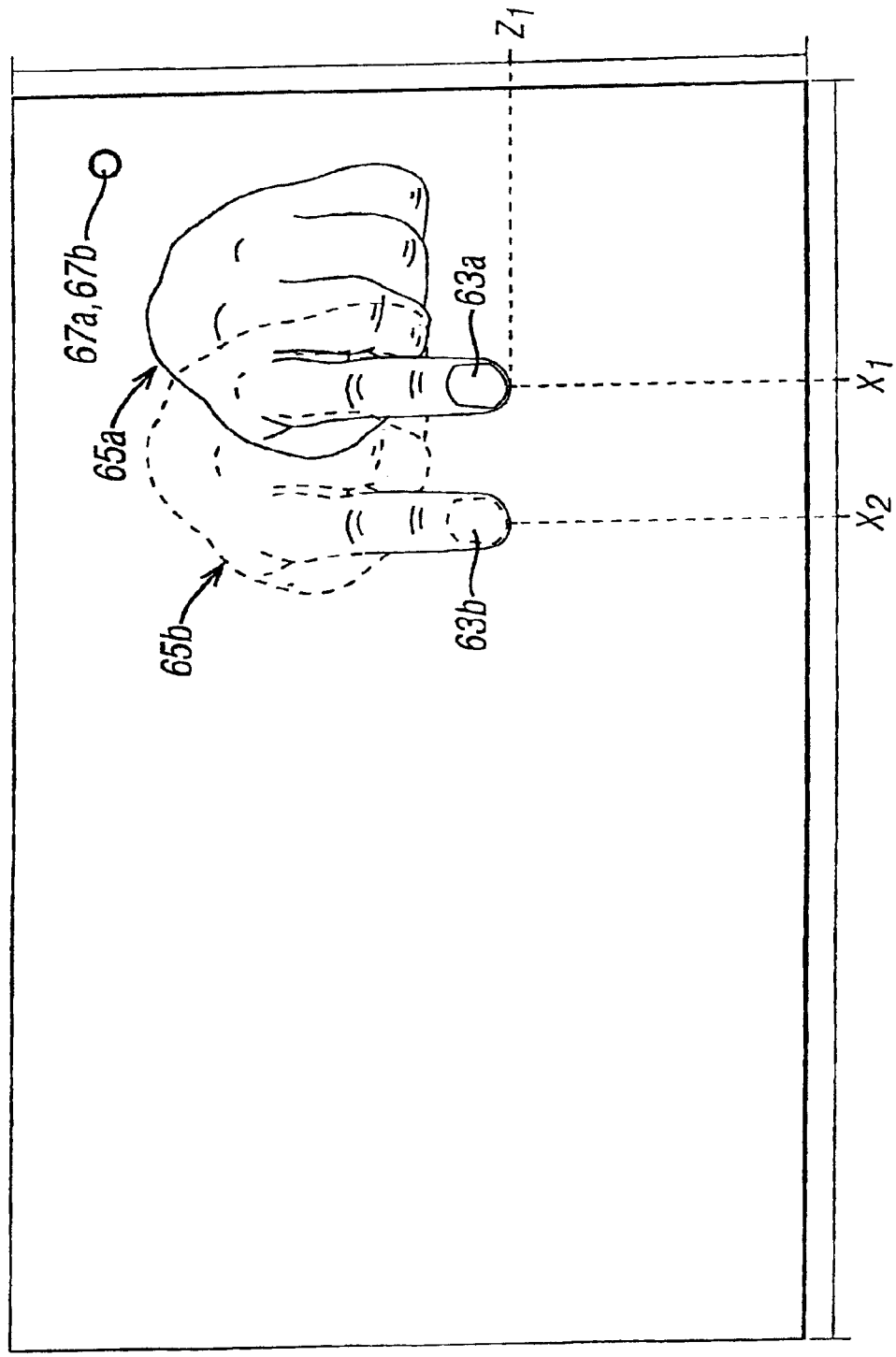

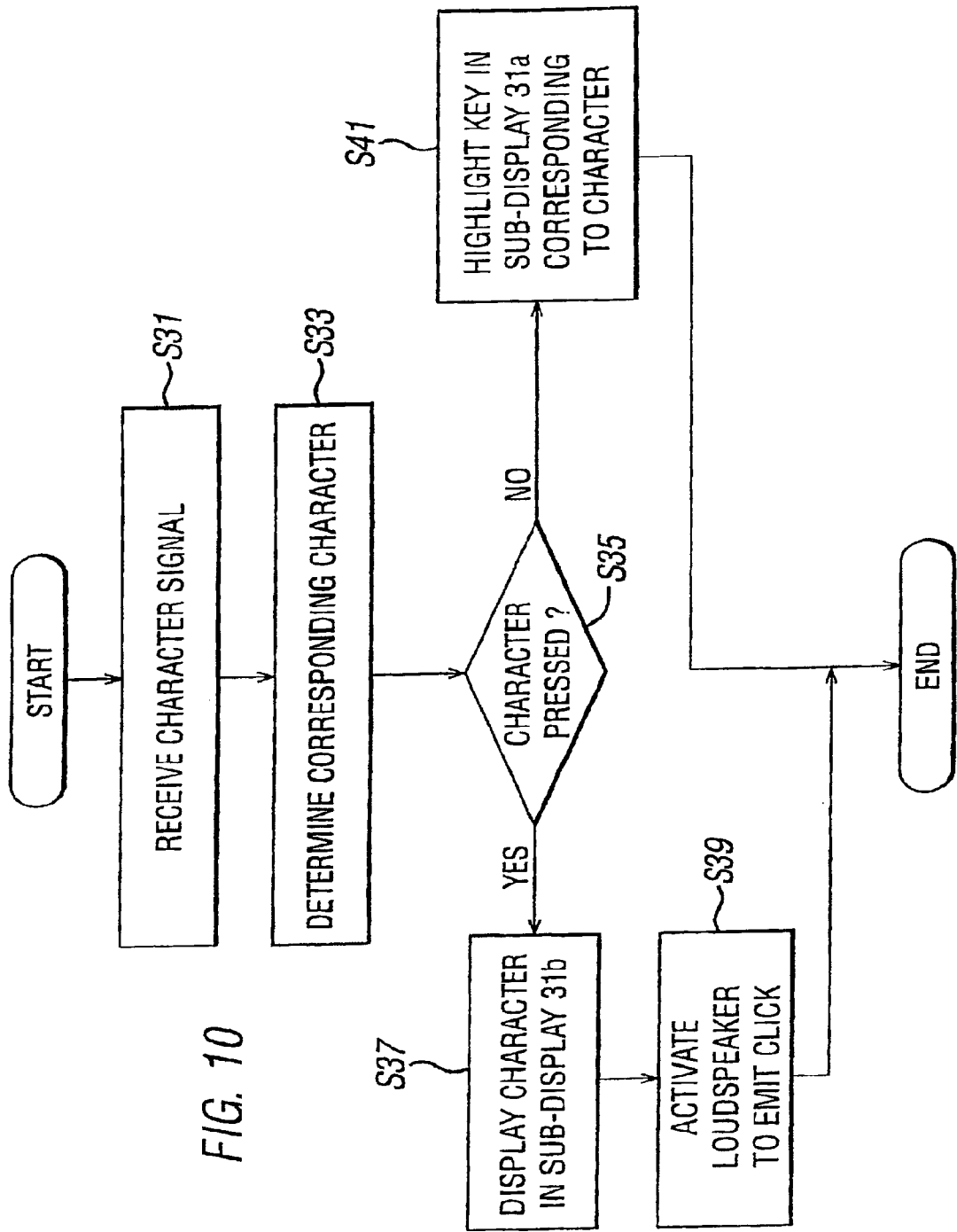

USER INTERFACE DEVICE

This invention relates to a user interface device via which a user inputs data to a data processing apparatus. It has particular, but not exclusive, relevance to a user interface device incorporated within a portable data processing apparatus such as a mobile phone, sometimes referred to as a cell phone, or a personal digital assistant (PDA), sometimes referred to as a palmtop computer.

For portable devices such as these, there is a general motivation to make the device as small as possible so that it can be easily carried, either on the person or in hand luggage. However, a problem with reducing the size of these devices is that manual data input becomes difficult because the input keys are inconveniently small.

One approach to solving this problem has been to provide a keyboard which is expanded during use and stored compactly when not in use. Examples of this approach are described in International Patent Application WO 00/54479 (a roll-out keyboard), U.S. Pat. No. 6,107,995 (an inflatable keyboard) and U.S. Pat. No. 5,712,760 (a foldable keyboard).

Another approach to solving this problem has been to use a virtual keyboard in which the keys are not physical objects but rather are associated with respective region of space. European Patent Application No. 0982676 describes a virtual keyboard in which a digital micromirror display (DMD) is used to project and image of a keyboard and two laser beams are used to identify which key of the image is being pressed by a user. European Patent Application No. 1039365 describes a virtual keyboard in which a laser diode and diffractive optics are sued to generate an image of a keyboard and reflections of a plurality of light beams are detected and processed to identify which key is being pressed by a user.

U.S. Pat. No. 5,767,842 describes a virtual keyboard in which a camera is used to monitor the hand and finger motions of a user, with different regions within the field of view of the camera being associated with respective different keys. In particular, the speed of movement of a finger of the user is monitored and the striking of a key recognised due to a rapid motion of the finger downwards followed by a short interval and then a movement upwards. The virtual keyboard described in U.S. Pat. No. 5,767,842 does not project an image of a keyboard, but instead a display is used to provide visual feedback to the user concerning the position of the user's fingers relative to the keys of the virtual keyboard.

An aim of this invention is to provide an alternative user interface device for entering data into a data processing apparatus.

According to an aspect of the invention, there is provided a user interface device for determing the position of one or more objects within a three dimensional zone, the device comprising:

first imaging means for forming a first two dimensional image, from a first viewpoint, of the object(s) against a first background; and second imaging means for forming a second two dimensional image, from a second viewpoint different from the first viewpoint, of the object(s) against a second background overlapping the first background;

wherein the first and second backgrounds are two dimensional views of the whole of the three dimensional zone;

the device further comprising position determining means for determining the position of an objet within the three dimensional zone from its position relative to the two backgrounds;

means for associating one or more object positions determined by the position determining means within the three dimensional zone with corresponding information; and means for generating a signal in accordance with the information corresponding to the one or more determined object positions within the three dimensional zone. By using images from two different viewpoints, the position of the object can be located in three dimensions using stereoscopic image processing techniques. The ability to determine the position of the object in three dimensions is advantageous because the analysis of the speed of movement of the object (as performed in U.S. Pat. No. 5,767,842) is no longer necessary.

Preferably, the first and second image data generating means have a common image capturing device in order to reduce the cost of the user interface device and to simplify the processing performed by the position determining means by removing the need to take account of different response characteristics for separate image capturing devices.

In an embodiment, different portions of the three-dimensional zone correspond to different keys of a virtual keyboard, and the generated data signal is indicative of the key corresponding to the determined object position.

In another embodiment, the user interface device comprises handwriting recognition means for converting a series of determined object positions into a corresponding character, and the generated data signal conveys the corresponding character.

Preferably the user interface device includes a display which is operable to display an indication of the position of an object within the zone to facilitate operation of the user interface device by providing feedback to a user.

Embodiments of the invention will now be described with reference to the attached figures, in which;

FIG. 8 is a schematic view of the first and second images when they are superimposed during the process described with reference to FIG. 7;

FIG. 10 is a flowchart illustrating a routine run by a main processor in the mobile phone in response to an input character signal;

Figure 1:
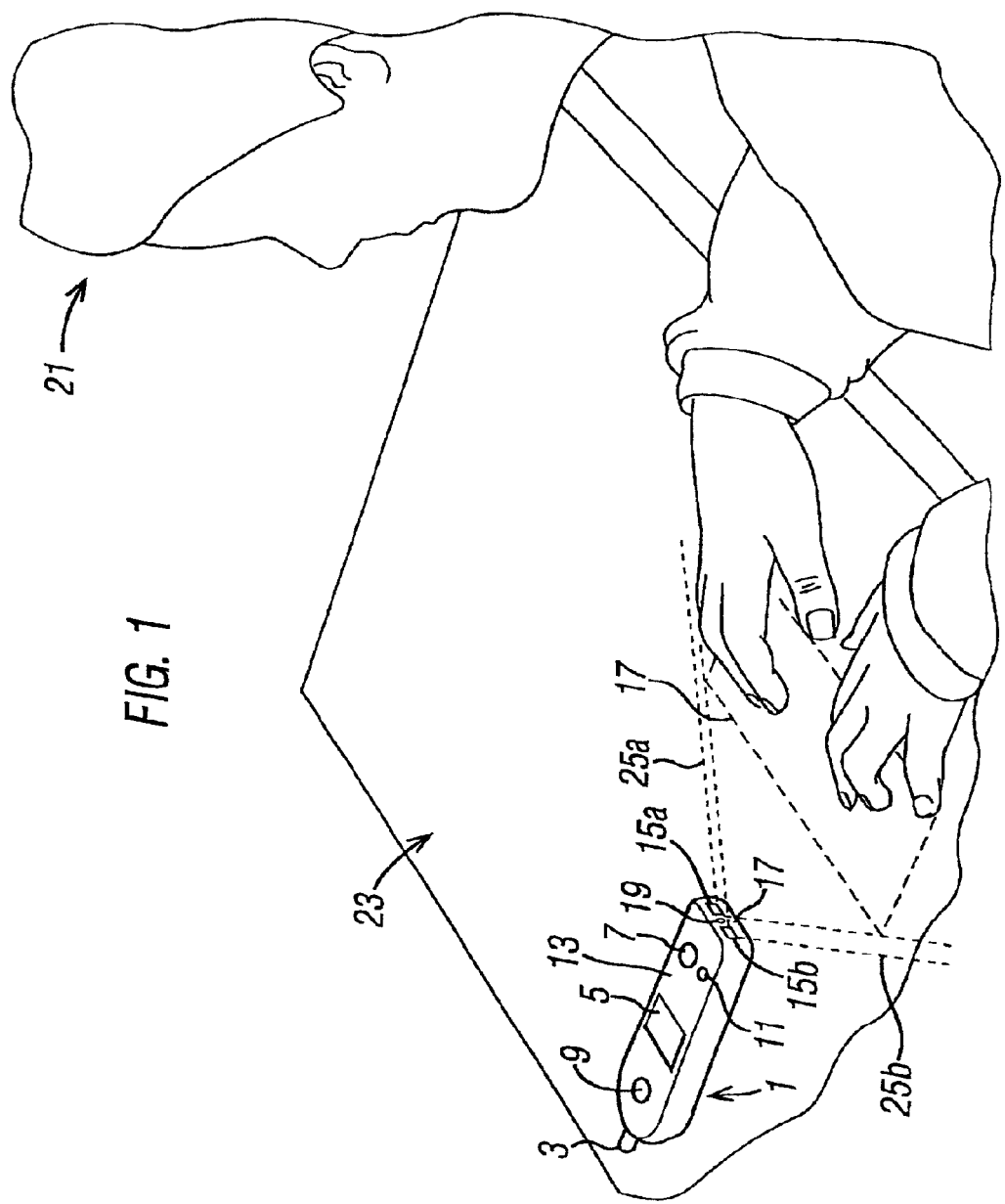
FIG. 1 is a perspective view of a user operating a virtual keyboard to input data into a mobile phone.

As shown in FIG. 1, in an embodiment a user interface device according to the invention forms part of a mobile phone 1 which communicates with a cellular network in accordance with the Global System for Mobile Communications (GSM) specification. The mobile phone 1 has an external antenna 3 which protrudes from its casing. A liquid crystal display (LCD) 5, a microphone 7, a loudspeaker 9 and an ON/OFF switch 11 are all formed in a display surface 13 of the casing. A first lens 15a and a second lens 15b are mounted in apertures formed in a viewer surface 17 of the casing which is adjacent to the display surface 13. In this embodiment, a light emitting diode (LED) 19 is mounted in the viewer surface 17 between the first and second lenses 15.

As shown, when a user 21 wishes to enter a text message, for example a message to be sent using the Short Message Service (SMS) defined in part 03.40 of the GSM specification, the mobile phone 1 is placed on the top surface of a table 23 with the display surface 13 facing upwards and the viewer surface 17 facing the user 21. The first and second lenses 15 are then located in a plane which is parallel to the surface of the table 23 and have respective fields of view, indicated in FIG. 1 by dotted lines and referenced 25a and 25b respectively.

A region (indicated by dashed lines and referenced 27 in FIG. 1) of the surface of the table 23 which is within the field of view 25 of both the first and second lenses 15 forms a virtual keyboard, although in this embodiment no image of a keyboard is projected onto the surface of the table 23. The region 27 is separated into a number of portions with each portion corresponding to a respective character. In this embodiment, the lay-out of the portions corresponds to a QWERTY keyboard and the user 21 inputs a character into the mobile phone 1 by touching the corresponding portion of the virtual keyboard formed in the region 27.

Figure 2:
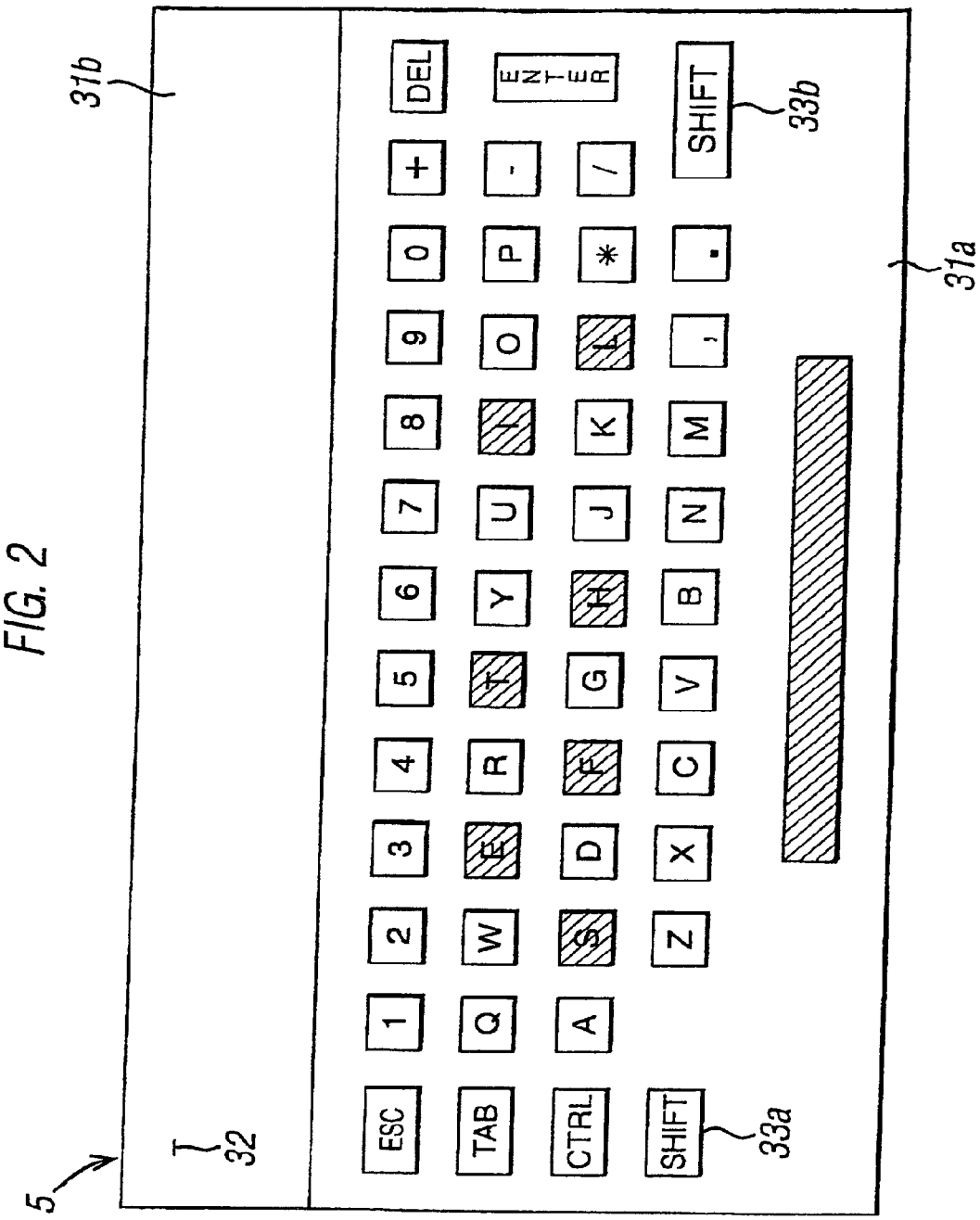
FIG. 2 is a plan view of the display of the mobile phone shown in FIG. 1 during the data input operation.

As shown in FIG. 2, the LCD 5 is split into two sub-displays 31a and 31b. In sub-display 31a, the layout of a QWERTY keyboard is shown. In this embodiment, as the fingers of the user 21 are moved in the three-dimensional zone above the region 27 of the surface of the table 19 and within the field of view 25 of both the lenses 15, the character corresponding to the portion of the region 23 underlying each finger is highlighted (as shown schematically in FIG. 2 for the letters S, E, F, T, H, I, L and the spacebar). In this way, the user 21 is able to position a finger over the portion of the region 23 for a desired character and then, by touching that portion, is able to input the desired character. In this embodiment, when a character is input the loudspeaker 7 emits a confirmatory "click" sound and the input character is displayed in the sub-display 31b at a position indicated by a flashing cursor 32.

If one of the shift keys 33a, 33b of the virtual keyboard is pressed then a different set of characters is displayed in the sub-display 31a. In particular, in this embodiment each upper case letter is replaced by the corresponding lower case letter while the numerals and punctuation signs are replaced by alternative punctuation signs.

In low ambient light conditions, the LED 19 is automatically switched on to illuminate the zone within the field of view of the first and second lenses 15.

Figure 3:
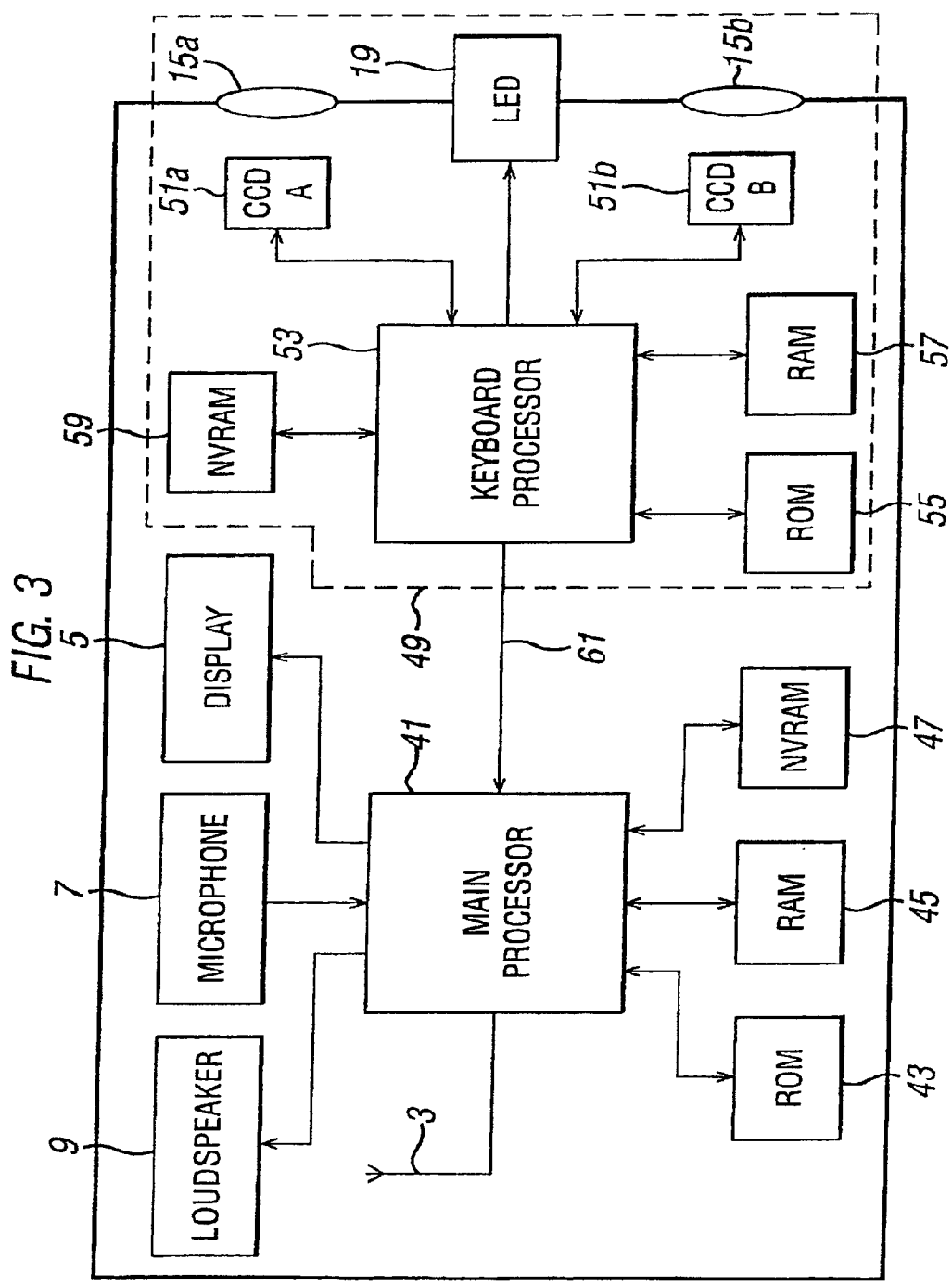
FIG. 3 is a schematic block diagram showing the contents of the mobile phone illustrated in FIG. 1.

FIG. 3 schematically shows the functional components of the mobile phone 1. It will be appreciated that the ON/OFF switch 11, the power source (which in this embodiment is a button battery) and many other conventional details of the mobile phone 1 have been omitted from FIG. 3 in the interests of clarity.

As shown, the antenna 3, the LCD 5, the microphone 7 and the loudspeaker 9 are all connected to a main processor 41. Also connected to the main processor 41 are a read only memory (ROM) 43, a random access memory (RAM) 45 and a non-volatile random access memory (NVRAM) 47. The ROM 43 stores routines which are used by the main processor 41 during operation of the mobile phone 1. For example, the ROM 43 stores conventional routines for converting voice signals received by the microphone 7 into radio frequency (RF) signals which are broadcast via the antenna 3, and for converting RF signals detected by the antenna 3 into corresponding audio signals which are converted into acoustic signals by the loudspeaker 9. The RAM 45 provides working memory which is used, for example, for temporarily storing a phone number associated with an incoming telephone call. The NVRAM 47 is used to store a phone book containing commonly-used phone numbers and to store variable configuration data, for example short-cut keys for a menu.

A keyboard unit, indicated by dashed lines and referenced 49, is also connected to the main processor 41. The keyboard unit 49 includes the first and second lenses 15 and the LED 19. The first lens 15a is positioned to form an image on a first charge-coupled device (CCD) 51a and the second lens 15b is positioned to form an image on a second CCD 51b. The first and second CCDs 51 each have a regular two dimensional pixelated array with a detector element, which stores charge in response to incident radiation, being positioned in each pixel. In particular, the amount of charge stored in each detector element is representative of the amount of radiation incident on the corresponding pixel.

The first and second CCDs 51 are connected to a keyboard processor 53 which is able to read sequentially the charges stored in the detector elements of the first and second CCDs 51. A ROM 55, a RAM 57 and an NVRAM 59 are also connected to the keyboard processor 53. The ROM 55 stores routines which are employed by the keyboard processor 53 during operation of the mobile phone 1, the RAM 57 provides working memory and the NVRAM 59 stores a look-up table which associates different parts of the zone within the field of view of both of the lenses 15 with corresponding characters. In this embodiment, the look-up table is stored in the NVRAM 59 so that the layout of the virtual keyboard can be changed, for example to match the size of hand of a user, by replacing the NVRAM 59.

The main processor 41 and the keyboard processor 53 are connected to each other by a conductor 61. The ROM 55 includes a Generate_Data routine for controlling the keyboard processor 53 to generate a data signal which is output, via the conductor 61, to convey character information to the main processor 41. The Generate_Data routine will now be described in detail with reference to FIGS. 4 to 9.

Figure 4:
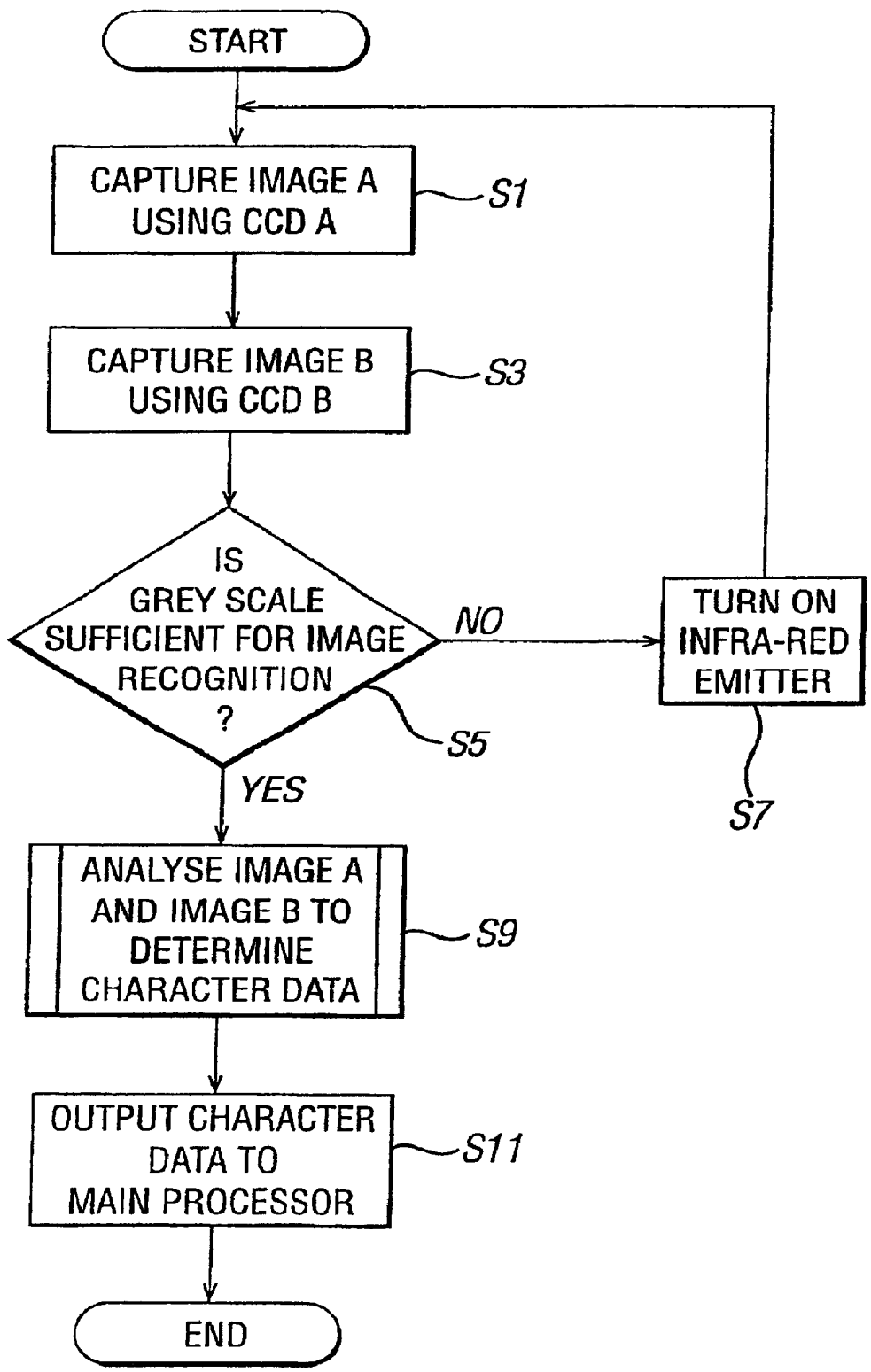
FIG. 4 is a flowchart illustrating a routine run by a keyboard processor in the mobile phone shown in FIG. 1 in order to generate a data signal corresponding to an input character.

FIG. 4 shows a flowchart for the Generate_Data routine. As shown, the keyboard processor 53 initially outputs, in step S1, a signal to the first CCD 51a which causes the first CCD 51a to capture an image, hereafter referred to as image A, and to send image data for image A to the keyboard processor 53 which stores the image data for image A in the RAM 57. In particular, the charge stored in the detector element of each pixel P (x, y) of the first CCD 51a is measured and converted to a corresponding digital value between 0 and 255. The digital value for each pixel P(x, y) is then stored in a corresponding memory location in the RAM 57.

Figure 5:
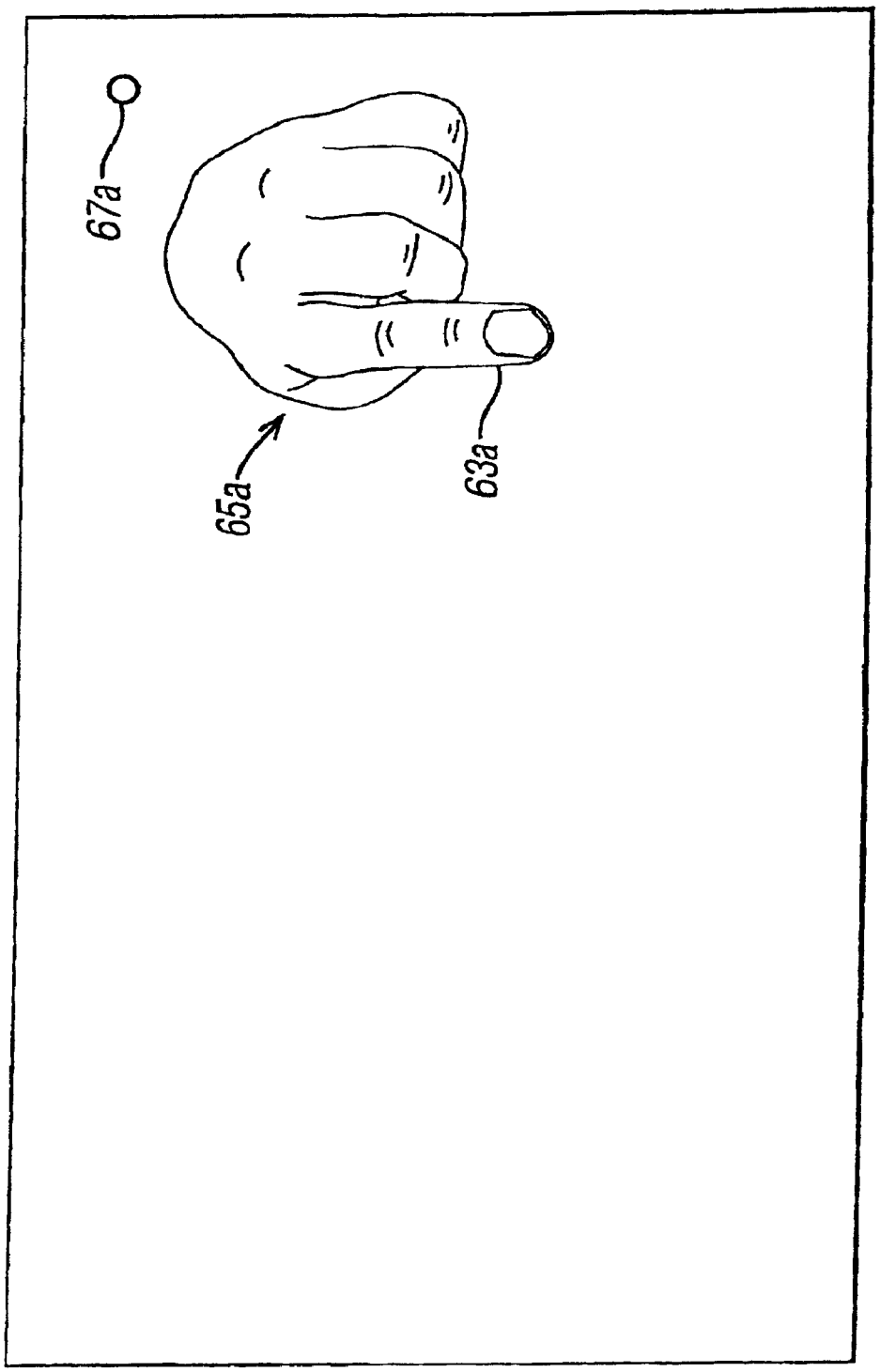
FIG. 5 is a schematic view showing a first image recorded in the mobile phone illustrated in FIG. 1 for a first viewpoint.

FIG. 5 shows a schematic view of image A when the user 21 is typing with a single finger 63a of one hand 65a. As shown in FIG. 5, during use a peripheral portion of image A above the hand 65a of the user will display a background image which has been schematically represented by a circle 67a.

Figure 6:
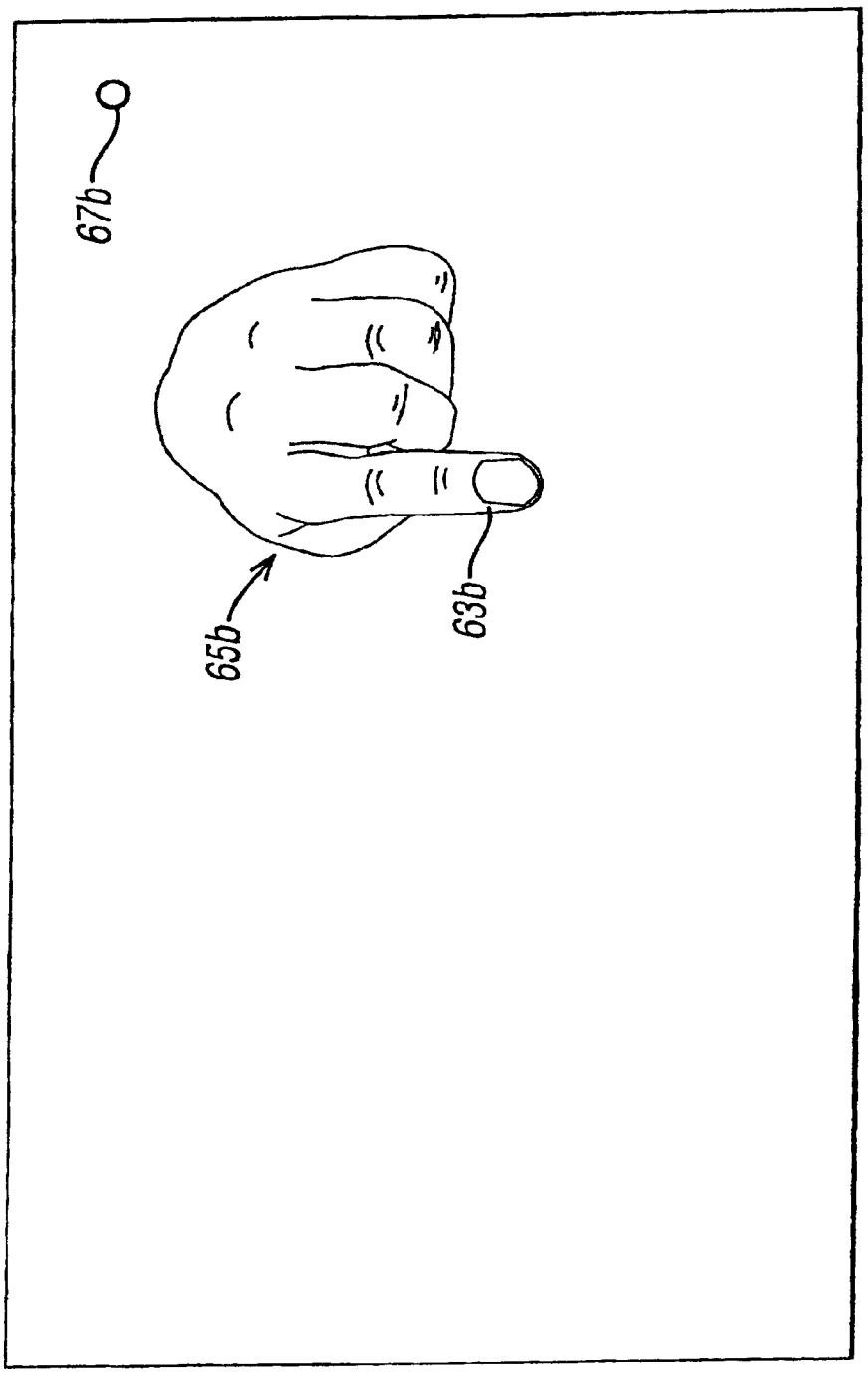
FIG. 6 is a schematic view showing a second image recorded in the mobile phone illustrated in FIG. 1 for a second viewpoint.

Returning to FIG. 4, after storing image data for image A the keyboard processor 53 outputs, in step S3, a signal to the second CCD 51b to capture an image, hereafter referred to as image B, and in the same manner as for the first CCD 51a multi-level image data for image B is generated and stored in the RAM 57. FIG. 6 shows a schematic view of an image B corresponding to the schematic view of image A shown in FIG. 5. As can be seen, in image B the relative position of the hand 65b and the circle 67b representing the background image above the hand 65b is different from the corresponding relative position in image A (as shown in FIG. 5) due to the different viewpoint.

The keyboard processor 53 then analyses, in step S5, the image data for image A and image B to determine if there is sufficient grey scale to perform image recognition. If it is determined that there is insufficient grey scale, then the keyboard processor 53 switches on the LED 19, in step S7, and then repeats steps S1 and S3 of the Generate_Data routine with the LED 19 switched on to obtain new image data for image A and image B.

When there is sufficient grey scale to perform image recognition, the keyboard processor 53 analyses, in step S9, the image data for image A and image B to determine character data which is then output, in step S11, from the keyboard processor 53 to the main processor 41.

Figure 7:
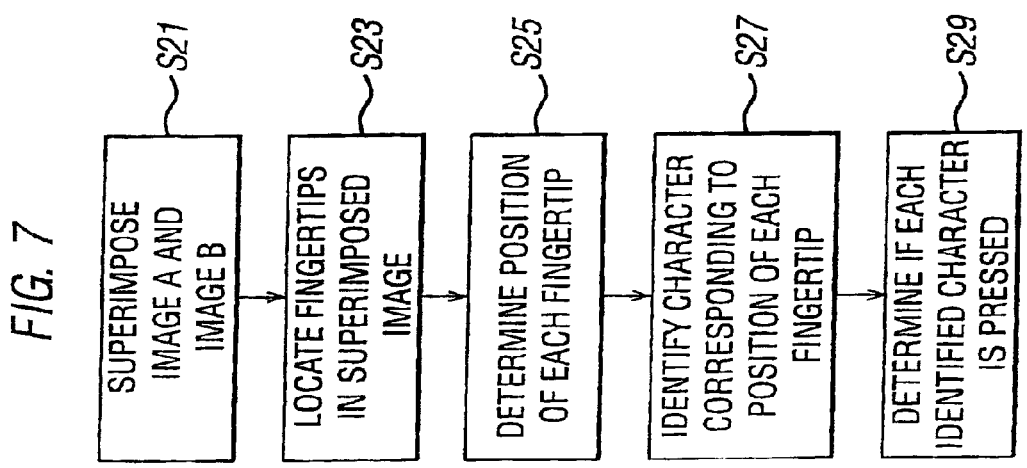
FIG. 7 is a flowchart illustrating how the first and second images are processed to identify the position of a fingertip of a user.

The process by which the character data is determined from the image data for image A and image B will now be described with reference to FIGS. 7 to 9. First, the keyboard processor 53 matches, in step S21, the backgrounds (represented by the circles 67) in the top portions of image A and image B by comparing the pixel data for the top portions of image A and image B to identify the common background pattern and re-aligning the image data for image B so that the image data for pixels corresponding to the top portion of image B overlaps the image data for pixels corresponding to the top portion of image A, i.e. the background images in the top portions of image A and image B share common pixel positions P(x, y). This is done so that pixel positions in image A and the re-aligned image B are measured from a common origin. As schematically shown in FIG. 8, the hand 65a from image A and the hand 65b from the re-aligned image B (shown in dashed lines) will not overlap in the superimposed image because of the different viewpoints.

The location of each fingertip in image A and image B is then determined in step S23. This involves identifying the outline of each finger 63 from the contrast in the grey scale between the image data for the finger 63 and the image data for the background, and then identifying the fingertip by performing a pattern recognition operation on the identified finger outline. In particular, each fingertip will have an approximately parabolic outline with the pixel $(X_n, Y_n)$ at the point of inflection of the parabola corresponding to the fingertip. In the example shown in FIGS. 5 and 6 there is only one finger and therefore two inflection points are determined, in particular pixel $P(X_1, Z_1)$ for the hand 65a from image A and pixel $P(X_2, Z_1)$ for the hand 65b from image B.

After the location of each fingertip has been determined, these locations are converted, in step S25, into a corresponding x, y, z co-ordinate for each finger tip. In particular, the height of the finger tip above the surface of the table 23, the z co-ordinate, is given by the value $Z_1$ for the fingertip in image A and the lateral position of the fingertip relative to the viewer surface 17 of the mobile phone 1, the x co-ordinate, is given by the value $X_1$ for the fingertip in image A. In order to determine the distance of the fingertip perpendicularly away from the mobile phone 1, the y co-ordinate, a trigonometrical calculation is performed based on parallax analysis using the location of each fingertip in image A and image B.

Figure 9:
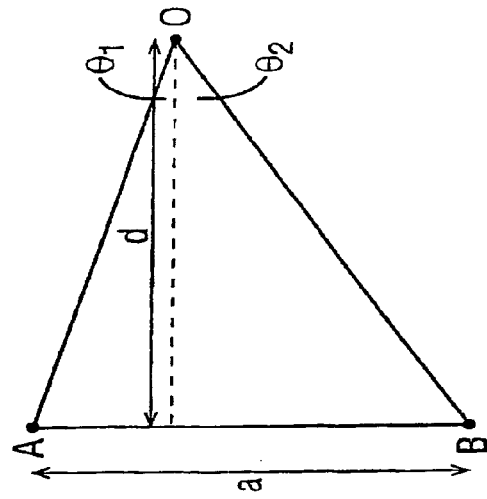
FIG. 9 is a schematic diagram showing a stereoscopic viewing arrangement.

Parallax techniques have been used for many years to determine the distances of stars from the earth. They use the following simple trigonometrical relationship:

$$d = \frac{a}{\tan\theta_1 + \tan\theta_2} \quad (1)$$

where, as shown in FIG. 9, "a" is the distance between two observation points "A" and "B", "d" is the perpendicular distance of the object of interest "O" from the line joining the two observation points, $\theta_1$ is the angle subtended between the line connecting the object of interest to the first observation point A and the line from the object of interest which perpendicularly intersects the line between the two observation points, and $\theta_2$ is the angle subtended between the line connecting the object of interest to the second observation point B and the line from the object of interest which perpendicularly intersects the line between the two observation points. If "d" is significantly larger than "a", as will be the case in this embodiment in which "a" is approximately 3 cm and "d" is approximately 20 to 25 cm, then Equation 1 can be simplified to:

$$d = \frac{a}{\sin\theta} \quad (2)$$

where $\theta$ is equal to $\theta_1$ plus $\theta_2$. In this embodiment, $\theta$ will typically be approximately 8°.

For the mobile phone 1, the parallax equation can be represented by:

$$d = \frac{a}{\alpha_1 N_1 - \alpha_2 N_2} \quad (3)$$

where $\alpha_1$ and $\alpha_2$ are respectively the number of pixels per unit length in the X direction for the first CCD 51a and the second CCD 51b, $N_1$ is the number of pixels away from the origin in the x direction for the location of the fingertip in image A and $N_2$ is the number of pixels away from the origin in the x direction for the fingertip in the re-aligned image B corresponding to the fingertip. The y co-ordinate is then given by the value of "d".

It will be appreciated that the calculation of x, y and z coordinates in this way could consume a large amount of processing power. In order to save processing power, an alternative position determination technique may be used in which the two images are precalibrated. Then the two images need not be overlaid for the backgrounds to match. A pixel "grid" is assigned to represent each key position for each image view. For example, if a fingertip occupies pixel A3 in the first image and A4 in the second image the key to which this combination corresponds can be determined from a look up table.

It is possible that whichever position determination technique is used, two (or more) possible results are obtained. For example a finger overlying one key could give a similar pair of images to a finger pressing the key in front of it, partly due to the constraints of the resolution of the imaging device. However the apparent finger size in these two possible finger positions will be different. In order to take account of this the user may be asked to run through a calibration procedure to determine finger size to assist in determining which of these two possible results is correct.

Returning to FIG. 7, once the x,y,z co-ordinates for each fingertip have been determined, the character corresponding to each position is identified, in step S27 using the look-up tables stored in the NVRAM 59. Next, the keyboard processor determines from the determined z co-ordinate, in step S29, whether or not the identified character is pressed. In particular, if the determined z co-ordinate is below a threshold value then the character is judged to have been pressed.

The character signal output in step S11 to the main processor 41 comprises a character and an indication as to whether that character has been pressed. FIG. 10 shows an input_character routine which is stored in the ROM 43 and run by the main processor 41 when a character signal is received from the keyboard processor 53. As shown, the main processor 41 receives, in step S31, the character signal and determines, in step S33, from the character signal the corresponding character. Then the main processor 41 determines, in step S35, from the character signal whether the character has been pressed or not. If it is determined that the character has been pressed, then the main processor 41 causes, in step S37, the character to be displayed in the sub-display 31b and causes, in step S39, the loudspeaker to emit a confirmatory click sound. If it is determined in step S35 that the character has not been pressed then the main processor 41 causes, in step S41, the key corresponding to the character in the sub-display 31a to be highlighted.

It will be appreciated that the size of the region 27 on the surface of the table 23 can be made significantly larger than the size of the mobile phone 1, and therefore the keys of the virtual keyboard can be significantly larger than those for a corresponding real keyboard formed in the casing of the mobile phone 1.

In the above description of the first embodiment, for ease of illustration only one finger of the user inputs character information. However, it will be appreciated that the same processing techniques can be applied when the user uses two or more fingers to enter character information. In principle, the user could use all ten digits.

In the first embodiment, separate CCDs are used to receive the images from the lenses 15. A second embodiment will now be described with reference to FIG. 11 in which a single CCD is used which has the advantage that the keyboard processor does not have to account for differences between two separate CCDs when matching the backgrounds and calculating fingertip positions. Further, using a single CCD reduces the cost of the mobile phone.

Figure 11:
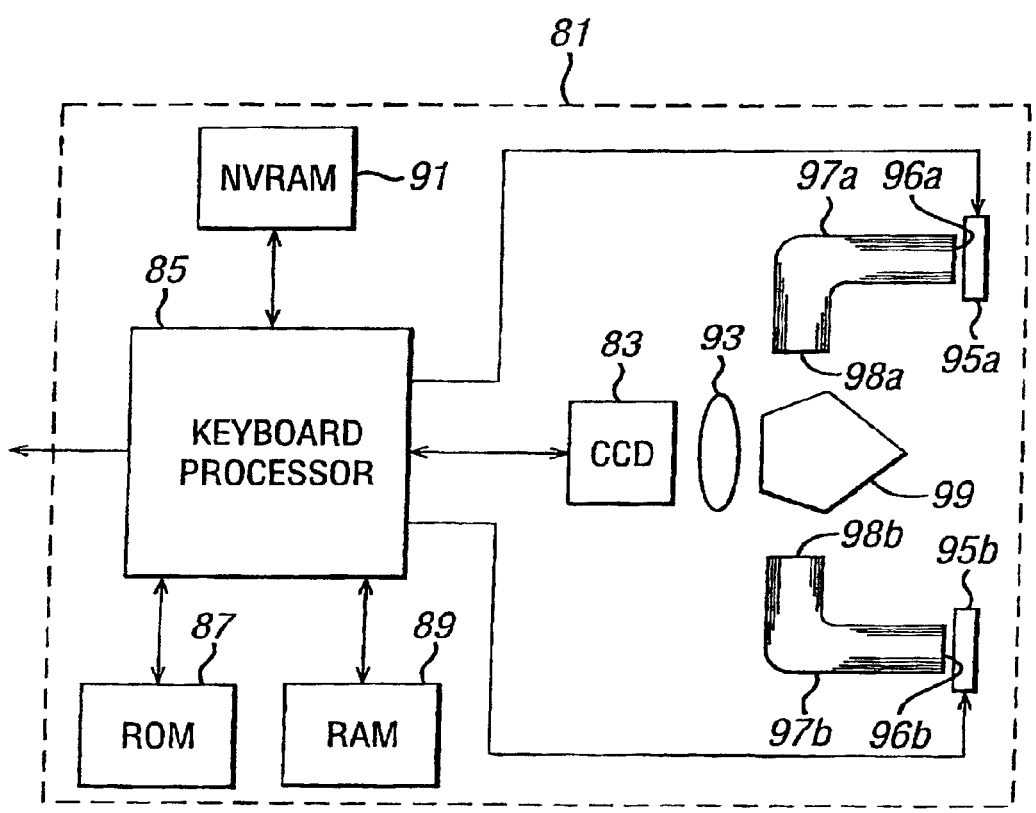
FIG. 11 is a schematic block diagram showing the contents of a first alternative virtual keyboard device for the mobile phone illustrated in FIG. 1.

FIG. 11 shows the keyboard unit 81 of the second embodiment in which the LED has been omitted in the interests of clarity. The remaining components of the mobile phone 1 are identical to those of the first embodiment and will not, therefore, be described again.

As shown in FIG. 11, in the second embodiment a single CCD 83 is connected to a keyboard processor 85. A ROM 87, a RAM 89 and an NVRAM 91 are also connected to the keyboard processor 85. A single lens 93 is positioned to form images on the CCD 83.

A first shutter 95a and a second shutter 95b are mounted in the apertures in the viewing surface of the casing of the mobile phone 1 (in place of the lenses which are so mounted in the first embodiment). In this embodiment, each shutter is a semiconductor device of the type described in International Patent Publication WO 98/45885 (the contents of which are hereby incorporated by reference). In particular, each shutter 95 comprises a semiconductor substrate with a planar photodiode layer formed on one side of the substrate, which faces towards the exterior of the casing of the mobile phone 1, and with a planar light-emitting diode (LED) layer formed on the other side of the substrate, which faces towards the interior of the casing of the mobile phone 1. Transparent electrodes are formed on the photodiode layer and the LED layer.

When no voltage is applied across the transparent electrodes, photons absorbed by the photodiode layer generate electron-hole pairs which recombine within or adjacent to the photodiode layer. However, if a potential in the region of 5 volts is applied across the transparent electrodes then the conduction electrons which are generated when photons are absorbed are accelerated along a direction substantially parallel to the crystal axis of the semiconductor substrate towards the LED layer, where the electrons cause photons to be emitted. In this way, effectively the transmissivity of each of the shutters 95 is controlled by varying the voltage applied across the transparent electrodes. In this embodiment, the LED layer emits light whose wavelength matches the peak sensitivity of the CCD 83 to improve signal levels, which is particularly advantageous in low light conditions. The keyboard processor 85 is able to switch the transmissivity of the shutters 95 between an ON state, in which the shutter 95 is highly transmissive, and an OFF state, in which the shutter 95 effectively blocks all light.

One end 96a of a first light guide 97a is positioned adjacent to the first shutter 95a so that light transmitted through the first shutter 95a enters the first light guide 97a. Similarly, one end 96b of a second light guide 97b is positioned adjacent to the second shutter 95b so that light transmitted through the second shutter 95b enters the second light guide 97b. The light guides 97 are formed by coherent fibre bundles.

The other end 98a of the first light guide 97a is positioned adjacent to a pentagonal prism 99 so that light emitted from the other end 98a enters the pentagonal prism 99, in which it is reflected off two surfaces, and is directed onto the lens 93 which forms an image on the CCD 83. Similarly, the other end 98b of the second light guide 97b is positioned adjacent to the pentagonal prism 99 so that light emitted from the other end 98b of the second light guide 97b enters the pentagonal prism 99, in which it is reflected off two surfaces, and is directed onto the lens 93 which forms an image on the CCD 83. Suitable pentagonal prisms include the Penta Prisms sold by Edmund Industrial Optics of 101 East Gloucester Pike, Barrington, N.J., USA.

The ROM 87 stores a generator_data routine which operates in the same manner as that of the first embodiment except for the manner in which the image data for image A and image B is obtained. In this embodiment, the image data for image A is obtained by the keyboard processor 85 switching the first shutter 95a into the ON state, so that light passing through the first shutter 95a enters the first light guide 97a and is directed by the pentagonal prism 99 onto the lens 93 which forms the image A on the CCD 83, while switching the second shutter 95b into the OFF state. The keyboard processor then reads multi-level image data from the CCD 83 for image A. Similarly, in order to obtain the image data for image B, the keyboard processor 85 switches the second shutter 95b into the ON state so that light transmitted through the second shutter 95b enters the second light guide 97b and is directed by the pentagonal prism 99 onto the lens 93 which forms image B on the CCD 83 and switches the first shutter 95a into the OFF state. The keyboard processor 85 then downloads multi-level pixel data for image B from the CCD 83. In this embodiment, the shutters 95a and 95b are only moved into the ON state for 1/60 of a second and ten pairs of image A and image B are captured per second.

Figure 12:
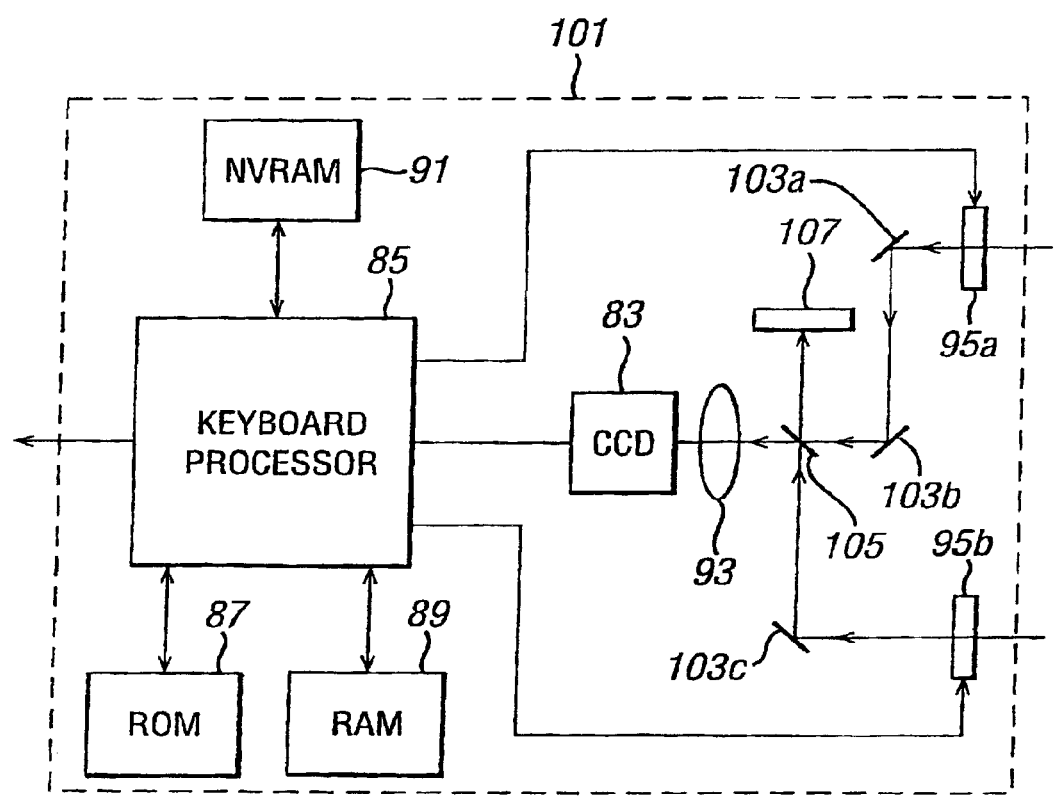
FIG. 12 is a schematic block diagram showing the contents of a second alternative virtual keyboard device for the mobile phone illustrated in FIG. 1.

In the second embodiment, light passing through the first shutter 95a and the first light guide 97a will be incident on the CCD 83 at a different angle to light passing through the second shutter 95b and the second light guide 97b. This leads to an additional shift in position of image A and image B which must be adjusted for when the top portions of image A and image B are superimposed during the procedure for determining the position of a user's fingertip. A third embodiment will now be described with reference to FIG. 12 in which light passing through the first shutter 95a is incident on the CCD 83 at the same angle as light passing through the shutter 95b.

As shown, the keyboard unit 101 of the third embodiment uses the same keyboard processor 85, ROM 87, RAM 89, NVRAM 91, CCD 83, lens 93 and shutters 95 as in the second embodiment. The light guides 97 and pentagonal prism 99 of the second embodiment are, however, replaced by a mirror arrangement.

Light passing through the first shutter 95a is incident on a first mirror 103a which fully reflects the light through 90° towards a second mirror 103b which fully reflects the light through 90° towards a half-mirror 105. Half of the light from the second mirror 103b is transmitted by the half-mirror 105 and is incident on the lens 93, which forms an image on the CCD 83. The other half of the light from the second mirror 103b is reflected by the half-mirror 105 onto a beam dump 107. Light transmitted through the second shutter 95b is incident on a third mirror 103c which fully reflects the transmitted light through 90° towards the half-mirror 105. Half of the light from the third mirror 103c is reflected by the half-mirror 105 onto the lens 93, which forms an image on the CCD 83. The other half of the light from the mirror 103c is transmitted through the half-mirror 105 and is incident on the beam dump 107.

The mirrors 103 and half-mirror 105 are positioned so that the light from the second mirror 103b transmitted by the half-mirror 105 overlaps the light from the mirror 103c reflected by the half-mirror 105. In this way, the offset between the backgrounds of the images from the first shutter 95a and the second shutter 95b is reduced, but at the expense of losing 50% of the light.

A number of modifications can be made to the above-described embodiments without departing from the concept of the invention.

In the first to third embodiments, the mobile phone 1 generates a virtual keyboard on the surface of the table 23. It will be appreciated that the virtual keyboard need not be formed on a solid surface, but could, instead, be formed in mid-air.

It will be appreciated that the mobile phone could have a conventional "real" keyboard in addition to the virtual keyboard, for example the mobile phone could have a keyboard of the type having keys for the numerals "0" to "9", a "*" key and a "#" key.

The mobile phone 1 need not generate a virtual keyboard but could instead generate a tablet for use in handwriting recognition. In this case, a user writes a character using a stylus (which could be, for example, a pen or a finger) with the keyboard processor sequentially storing the position of the stylus tip as the character is formed. The keyboard processor then determines the input character by using conventional handwriting recognition techniques to process the stored sequence of positions. Such handwriting recognition is well known from, for example, the Palm Pilot PDAs manufactured by US Robotics Inc.

In a preferred embodiment, the mobile phone 1 is able to receive data from either a virtual keyboard or a tablet for handwriting recognition. In order to do this, the mobile phone 1 receives an instruction from the user indicating the method of data input. This instruction could be entered by the user speaking a word which is interpreted by the mobile phone using speech recognition techniques which are commonly found in mobile phones, by the user pressing a button on the casing of the mobile phone or by the user making a distinctive movement within the field of view of the mobile phone.

It will be appreciated that the LED described in the first embodiment is not an essential feature of the invention. For example, if there is insufficient grey-scale contrast for pattern recognition to be performed then the mobile phone could display a message on the LCD indicating that the user must provide more illumination by either moving the mobile phone or providing an additional light source. Further, in an embodiment having an LED, this message could be displayed if there is still insufficient grey scale with the LED switched on.

It will be appreciated that the display of the mobile phone need not be an LCD, although for a mobile phone use of an LCD is preferred due to their low cost, low power requirements and maturity of technology.

In the first to third embodiments, CCDs were used to capture an image. Alternatively, other two-dimensional detectors could be used such as charge injection devices (CIDs) and photodiode arrays.

Colour detectors could also be used to capture the images. This would improve the ability to match the backgrounds of image A and image B. After the backgrounds have been matched, the colour image data could be converted to grey scale image data and the processing would then proceed as described in the illustrated embodiments. A number of equations for transforming colour image data into grey scale image data are known. For example, for RGB image data having for each pixel data values R, G and B respectively corresponding to the level of red, green and blue for that pixel, an equivalent grey scale image can be generated by weighting the individual colour data values and adding them together to generate a data value corresponding to the luminance level. For example, the luminance level Y can be given by:

$$Y=0.299R+0.587G+0.114B \qquad (4)$$

However, if colour detectors are to be used in an embodiment which utilises a shutter, then the semiconductor devices of the type described in WO 98/45885 in which a single LED layer emits light in accordance with the amount of incident radiation cannot be used. Alternative shutters which could be used include electrically-controlled mechanical shutters, liquid crystal shutters and electro-optic crystal shutters. It will be appreciated that these alternative shutters could also be used with non-colour detectors.

In the processing performed in the first to third embodiments to determine the positions of the user's fingertips from image A and image B, the image data for image B is re-aligned to superimpose the background portions, and then the positions of the fingertips are located in image A and the re-aligned image B. Alternatively, a single image C could be formed by combining image A and the re-aligned image B, and then the position of the fingertips could be determined using just the image C. However, it is envisaged that difficulties could be encountered with this approach in correctly identifying the two fingertips in image C, one from image A and one from image B, corresponding to a single finger if more than one finger is used.

In the third embodiment, a mirror arrangement is used to direct light from two separate shutters onto a CCD in such a manner that the light beams from the two shutters overlap. If the mirror arrangement is precisely aligned, then the offset between the background images for the two shutters can be removed. If the background image offset is removed, then the shutters are no longer necessary because the images of the object from the two different viewpoints can simultaneously be formed on the image caption device and the position of the object determined from the image data for a single image captured by the image capturing device.

In the first to third embodiments, the look-up table associating regions within the field of view of the mobile phone 1 with corresponding keys is stored in a removable NVRAM so that the keyboard layout can be changed by replacing the NVRAM. It will be appreciated, however, that the look-up table could be stored in ROM if only one keyboard layout was considered satisfactory. Alternatively, a plurality of look-up tables corresponding to a plurality of different keyboard layouts could be stored in a ROM and the user could select a desired keyboard layout by, for exmple, a speech command or by using other data input devices provided by the mobile phone.

In the second embodiment, the angle of acceptance of the light guides can be increased by using a lens, such as a fish-eye lens. This would, however, also have the effect of reducing the amount of light at near normal incidence to the mobile phone which enters the light guide and will also introduce extra distortion into the captured images which must be accounted for when processing the captured images to determine the user's fingertip position.

It will be appreciated that the invention could be applied to mobile phones which communicate with cellular networks that do not conform with the GSM specification. Further, as well as entering SMS text messages, the virtual keyboard could also be used to enter e-mails or text information to be stored in the mobile phone for subsequent recall by the user, for example diary entries.

Although in the described embodiments no image of a keyboard is projected, but rather visual feedback is provided via the display, alternatively an image of the keyboard could be projected using, for example, a digital micro-mirror display (DMD) as described in European Patent Application No 0982686 or diffractive optics as described in European Patent Application No. 1039365.

In the first to third embodiments, a separate processor to the main processor of the mobile phone was used for the user input device so that a similar processor to that used in conventional mobile phones can be used as the main processor. However, it will be appreciated that a single processor with additional processing power could be used instead of the two separate processors.

Although the illustrated embodiments describe a mobile phone, the user interface device could also be used in other data processing apparatuses. In particular, the user interface device could also be used with portable devices such as PDAs. The data processing apparatuses need not be powered by batteries but could alternatively be powered by the electric mains or solar cells.

As the mobile phone (or other data processing apparatus) according to the invention has means for capturing an image, this image capturing means can be used to capture images which are subsequently electronically transmitted to another data processing apparatus. For example, a mobile phone according to the invention could be used as a fax machine or as a video phone. Alternatively, a PDA could capture an image and transmit the data for the captured image over the internet.

The invention extends to computer programs which enable a processor to implement the invention, particularly computer programs in or on a carrier. The program may be in the form of source code, object code, a code intermediate source and object code such as in partially compiled form, or in any other form suitable for use in a processor.

The carrier can be any entity or device capable of carrying the program. For example, the carrier may comprise a storage medium such as a ROM, and in particular a semiconductor ROM for insertion directly into a processing circuit. The storage medium could, however, also be a different form of ROM, for example a CD ROM, or a magnetic recording medium, for example a floppy disc or a hard disc. Further, the carrier may be a transmissible carrier such as electrical or optical signal which may be conveyed via electrical optical cable or by radio or other means.

What is claimed is:

1. A user interface device for determining the position of one or more objects within a three dimensional zone, the device comprising:

first imaging means for forming a first two dimensional image, from a first viewpoint, of the object(s) against a first background; and second imaging means for forming a second two dimensional image, from a second viewpoint different from the first viewpoint, of the object(s) against a second background overlapping the first background;

wherein the first and second backgrounds are two dimensional views of the whole of the three dimensional zone;

the device further comprising position determining means for determining the position of an object within the three dimensional zone from its position relative to the two backgrounds;

means for associating one or more object positions determined by the position determining means within the three dimensional zone with corresponding information; and means for generating a signal in accordance with the information corresponding to the one or more determined object positions within the three dimensional zone.

2. A user interface device according to claim 1, wherein:

the first imaging means comprises a first optical aperture;

the second imaging means comprises a second optical aperture which is spatially separated from the first aperture; and the image data generating means comprises an image capturing device provided in common to the first and second imaging means.

3. A user interface device according to claim 2, wherein the image data generating means further comprises:

a first shutter operable to prevent the forming of the first image on the common image capturing device by the first imaging means; and a second shutter operable to prevent the formation of the second image on the common image capturing device by the second imaging means.

4. A user interface device according to claim 1, wherein the image data generating means comprises first and second image capturing means which are spatially separated from each other, wherein the first imaging means is operable to form the first image on the first image capturing means and the second imaging means is operable to form the second image on the second imaging capturing means.

5. A user interface device according to claim 2, wherein the first and second imaging means are provided with a common lens for forming the first and second images on the common image capturing device.

6. A user interface device according to claim 2, further comprising:
a first light guide operable to receive light transmitted through the first optical aperture; and
a second light guide operable to receive light transmitted through the second optical aperture.

7. A user interface device according to claim 6, further comprising beam directing means operable to direct light transmitted through the first and second light guides towards the common image capturing device.

8. A user interface device according to claim 7, wherein the beam directing means comprises a pentagonal prism.

9. A user interface device according to claim 2, further comprising:
a beam splitter operable to transmit a portion of incident light and reflect another portion of incident light;
first beam directing means operable to direct light transmitted through the first optical aperture so that the light from the first aperture which is transmitted by the beam splitter is directed towards the common image capturing device; and
second beam directing means for directing light transmitted through the second optical aperture to the beam splitter so that the light from the second aperture which is reflected by the beam splitter is directed towards the image capturing device;
wherein the beam splitter and the first and second beam directing means are arranged so that light from the first optical aperture transmitted by the beam splitter travels along the same optical path as light from the second optical aperture reflected by the beam splitter.

10. A user interface device according to claim 9, wherein the beam splitter and the first and second beam directing means are arranged so that the far-field portions of the first and second images substantially overlap at the image capturing device.

11. A user interface device according to claim 9, wherein the beam splitter is operable to transmit half the incident light from the first shutter and to reflect half the incident light from the second shutter.

12. A user interface device according to claim 1, including image capturing means comprising a charge-coupled device.

13. A user interface device according to claim 1, wherein the position determining means is operable to match the image data for a predetermined portion of the first image with the image data for a predetermined portion of the second image to form a common reference.

14. A user interface device according to claim 13, wherein the predetermined portion of the first image and the predetermined portion of the second image are located at a peripheral region of the first and second images.

15. A user interface device according to claim 1, wherein said position determining means is operable to determine the outline of one or more objects within the three-dimensional zone by identifying a change in contrast between the image data for the background and the image data for the object.

16. A user interface device according to claim 15, wherein the position determining means is operable to determine a reference position on the object by performing a pattern recognition operation on the determined outline.

17. A user interface device according to claim 16, wherein the position determining means is operable to recognise the pattern corresponding to a finger, and wherein said reference position corresponds a fingertip.

18. A user interface device as claimed in claim 1 wherein the position determining means is operable to determine the position of the object in the three dimensional zone from stored data calibrating object positions within the respective two dimensional images to actual positions within the three dimensional zone.

19. A user interface device according to claim 1, wherein the associating means comprises storing means storing data associating portions of the three-dimensional zone with corresponding information.

20. A user interface device according to claim 19, wherein the storing means stores data associating portions of the three-dimensional zone with corresponding keys of a keyboard.

21. A user interface device according to claim 20, wherein the user interface device further comprises means for determining whether or not the key corresponding to the position of the object is pressed from the position of the object.

22. A user interface device according to claim 21, wherein the generating means is operable to generate a data signal conveying an indication of the key corresponding to the position of the object together with an indication whether the corresponding key has been pressed.

23. A data processing apparatus comprising:
a user interface device according to claim 22; and
a display means,
wherein said display means is operable to display a representation of said keyboard and, in response to said data signal, to indicate the key corresponding to the position of the object but not pressed.

24. A user interface device according to claim 1, wherein said associating means comprises a detachable non-volatile memory for storing a look-up table.

25. A user interface device according to claim 1 wherein the associating means comprises handwriting recognition means for determining an input character corresponding to a sequence of positions of the object within the three-dimensional zone.

26. A user interface device as claimed in any preceding claim further comprising means for determining the size of an object whose position is to be determined to assist in the correct determination of its position.

27. A communications device comprising a user interface device according to claim 1.

28. A communications device according to claim 27, wherein the communications device is a mobile phone.

29. A data processing apparatus comprising:
a user interface device according to any preceding claim; and
a display means,
wherein the display means is operable to display input data in accordance with the data signal generated by the user interface device.

30. A communication device comprising a data processing apparatus according to claim 29.

31. A palmtop computer comprising a data processing apparatus according to either claim 29.

32. A method of inputting data into a data processing apparatus relating to the position of one or more objects within a three dimensional zone, the method comprising:
forming a first two dimensional image from a first viewpoint, of the object(s) against a first background;
forming a second two dimensional image from a second viewpoint different from the first viewpoint, of the object(s) against a second background which overlaps the first background, said first and second backgrounds being two dimensional views of the whole of the three dimensional zone;

generating image data corresponding to the first and second images;

determining the position of an object within the three-dimensional zone from its position relative to the two backgrounds using the image data corresponding to the first and second images;

associating one or more object positions determined in the position determining step within the three-dimensional zone with corresponding information; and generating a signal in accordance with the information corresponding to the one or more determined object positions within the three-dimensional zone.

33. A method as claimed in claim 32 comprising storing data calibrating object positions within the respective first and second two dimensional images to actual positions within the three dimensional zone and using the stored data to determine position of the object(s).

34. A data processing method for determining information corresponding to one or more positions of an object in a three-dimensional zone, the method comprising the steps of:

receiving image data corresponding to a first two dimensional image from a first viewpoint of the object(s) against a first background;

receiving image data corresponding to a second image, from a second viewpoint different from the first viewpoint, of the objects against a second background overlapping the first background, the first and second backgrounds being two dimensional images of the whole of the three dimensional zone;

processing the image data corresponding to the first and second images to determine the position of the object in the three-dimensional zone; and associating one or more object positions determined in said processing step with corresponding information.

35. A method as claimed in claim 34 further comprising determining the size of an object whose position is to be determined and using determined object size information in the determination of the position of the object.

36. A computer program product for enabling a programmable apparatus to carry out a method according to claim 34.

37. A storage medium storing a computer program product according to claim 36.

38. A signal conveying a computer program product according to claim 36.

* * * * *